United States Patent
Gottlieb (10) Patent No.: US 10,133,916 B2
(45) Date of Patent: Nov. 20, 2018

(54) IMAGE AND IDENTITY VALIDATION IN VIDEO CHAT EVENTS

(71) Applicant: Steven M. Gottlieb, New York, NY (US)

(72) Inventor: Steven M. Gottlieb, New York, NY (US)

( * ) Notice: Subject to any disclaimer, the term of this patent is extended or adjusted under 35 U.S.C. 154(b) by 121 days.

(21) Appl. No.: 15/258,457

(22) Filed: Sep. 7, 2016

(65) Prior Publication Data

US 2018/0068174 A1 Mar. 8, 2018

(51) Int. Cl.
| | |
|---|---|
| *G06K 9/00* | (2006.01) |
| *G06F 21/32* | (2013.01) |
| *G06K 9/62* | (2006.01) |
| *H04N 7/15* | (2006.01) |

(52) U.S. Cl.
CPC ......... *G06K 9/00288* (2013.01); *G06F 21/32* (2013.01); *G06K 9/00255* (2013.01); *G06K 9/6202* (2013.01); *H04N 7/15* (2013.01)

(58) Field of Classification Search
CPC ........... G06K 9/00288; G06K 9/00255; G06K 9/6202; G06F 21/32; H04N 7/15
See application file for complete search history.

(56) References Cited

U.S. PATENT DOCUMENTS

| | | | |
|---|---|---|---|
| 5,040,231 A | 8/1991 | Terzian | |
| 5,612,716 A | 3/1997 | Chida et al. | |
| 5,728,960 A | 3/1998 | Sitrick | |
| 5,847,709 A | 12/1998 | Card | |
| 6,044,146 A | 3/2000 | Gisby et al. | |
| 6,084,168 A | 7/2000 | Sitrick | |
| 6,241,612 B1 | 6/2001 | Heredia | |
| 6,259,471 B1 | 7/2001 | Peters et al. | |
| 6,419,137 B1 | 7/2002 | Marshall et al. | |
| 6,515,681 B1 | 2/2003 | Knight | |
| 6,559,863 B1 | 5/2003 | Megiddo | |
| 6,654,346 B1 | 11/2003 | Mahalingaiah et al. | |
| 6,697,614 B2 | 2/2004 | Dorenbosch | |
| 7,007,235 B1 | 2/2006 | Hussein | |
| 7,159,237 B2 * | 1/2007 | Schneier | G06F 21/552 709/223 |
| 7,386,799 B1 | 6/2008 | Clanton | |
| 7,478,129 B1 | 1/2009 | Chemtob | |
| 7,487,211 B2 | 2/2009 | Beavers et al. | |

(Continued)

FOREIGN PATENT DOCUMENTS

| | | |
|---|---|---|
| CA | 2771785 | 3/2011 |
| CA | 2774014 | 4/2011 |

(Continued)

OTHER PUBLICATIONS

About TokBox, Inc., All about TokBox, http://www.tokbox.com/about, retrieved Feb. 4, 2011, p. 1.

(Continued)

*Primary Examiner* — Gregory M Desire
(74) *Attorney, Agent, or Firm* — Robert W. Morris; Ijeiku C. Aisiku; Eckert Seamans Cherin & Mellott, LLC (57) ABSTRACT

This generally relates to a user device and software located thereon capable of monitoring the attendance of users and their locations during an interactive online event. The present invention generally allows a host of an interactive online event to confirm the identity of users accessing the online event.

17 Claims, 9 Drawing Sheets

(56) References Cited

U.S. PATENT DOCUMENTS

| | | |
|---|---|---|
| 7,495,687 B2 | 2/2009 | DuMas et al. |
| 7,515,560 B2 | 4/2009 | DuMas et al. |
| 7,593,032 B2 | 9/2009 | Civanlar et al. |
| 7,787,447 B1 | 8/2010 | Egan et al. |
| 7,958,457 B1 | 6/2011 | Brandenberg |
| 8,037,139 B1 | 10/2011 | Fish |
| 8,060,560 B2 | 11/2011 | Vonog et al. |
| 8,144,187 B2 | 3/2012 | Moore et al. |
| 8,147,251 B1 | 4/2012 | Anson |
| 8,171,154 B2 | 5/2012 | Vonog et al. |
| 8,225,127 B2 | 7/2012 | Vonog et al. |
| 8,230,355 B1 | 7/2012 | Bauermeister |
| 8,390,670 B1 | 3/2013 | Gottlieb |
| 8,405,702 B1 | 3/2013 | Gottlieb |
| 8,429,704 B2 | 4/2013 | Vonog et al. |
| 8,458,328 B2 | 6/2013 | Dubovik et al. |
| 8,463,677 B2 | 9/2013 | Vonog et al. |
| 8,527,654 B2 | 9/2013 | Vonog et al. |
| 8,549,167 B2 | 10/2013 | Vonog et al. |
| 8,558,868 B2 | 10/2013 | Prentice |
| 8,635,293 B2 | 1/2014 | Fisher |
| 8,647,206 B1 | 2/2014 | Gottlieb |
| 8,749,610 B1 | 6/2014 | Gossweiler |
| 8,779,265 B1 | 7/2014 | Gottlieb |
| 8,902,272 B1 | 12/2014 | Gottlieb |
| 8,917,310 B2 | 12/2014 | Gottlieb |
| 8,929,516 B2 | 1/2015 | Odinak |
| 9,215,412 B2 | 12/2015 | Gottlieb |
| 9,241,131 B2 | 1/2016 | Desai |
| 9,418,214 B1* | 8/2016 | Harding .............. G06F 21/6254 |
| 9,516,022 B2* | 12/2016 | Borzycki .............. A63F 13/213 |
| 2002/0010679 A1* | 1/2002 | Felsher ................ G06F 19/328 705/51 |
| 2002/0094831 A1 | 7/2002 | Maggenti et al. |
| 2002/0102999 A1 | 8/2002 | Maggenti et al. |
| 2002/0126846 A1* | 9/2002 | Multerer ................ A63F 13/12 380/251 |
| 2002/0143877 A1 | 10/2002 | Hackbarth |
| 2002/0165921 A1 | 11/2002 | Sapieyevski |
| 2002/0169014 A1 | 11/2002 | Egozy et al. |
| 2003/0000369 A1 | 1/2003 | Funaki |
| 2003/0014262 A1 | 1/2003 | Kim |
| 2003/0044021 A1 | 3/2003 | Wilkinson |
| 2003/0097385 A1 | 5/2003 | Lee et al. |
| 2003/0110926 A1 | 6/2003 | Sitrick |
| 2003/0164084 A1 | 9/2003 | Redmann et al. |
| 2004/0022202 A1 | 2/2004 | Yang |
| 2004/0201668 A1 | 10/2004 | Matsubara et al. |
| 2004/0255253 A1 | 12/2004 | Marcian |
| 2005/0032539 A1 | 2/2005 | Noel et al. |
| 2005/0034075 A1 | 2/2005 | Belhumeur et al. |
| 2005/0078613 A1 | 4/2005 | Covell et al. |
| 2005/0086703 A1 | 4/2005 | Gupta |
| 2005/0132288 A1 | 6/2005 | Kim et al. |
| 2005/0143135 A1 | 6/2005 | Brems et al. |
| 2005/0144016 A1 | 6/2005 | Hewitt |
| 2005/0210416 A1 | 9/2005 | MacLaurin et al. |
| 2005/0262542 A1 | 11/2005 | DeWeese et al. |
| 2006/0002315 A1 | 1/2006 | Theurer |
| 2006/0031776 A1 | 2/2006 | Glein et al. |
| 2006/0055771 A1 | 3/2006 | Kies |
| 2006/0063555 A1 | 3/2006 | Robbins |
| 2006/0112814 A1 | 6/2006 | Paepcke |
| 2006/0114354 A1 | 6/2006 | Dunko |
| 2006/0117935 A1 | 6/2006 | Sitrick |
| 2006/0140138 A1 | 6/2006 | Hill |
| 2007/0011027 A1 | 1/2007 | Melendez |
| 2007/0039449 A1 | 2/2007 | Redmann |
| 2007/0078931 A1 | 4/2007 | Ludwig et al. |
| 2007/0140510 A1 | 6/2007 | Redmann |
| 2007/0186171 A1 | 8/2007 | Junozovic |
| 2007/0201809 A1 | 8/2007 | Karaoguz |
| 2007/0229652 A1 | 10/2007 | Center et al. |
| 2007/0234220 A1 | 10/2007 | Khan |
| 2007/0255816 A1 | 11/2007 | Quackenbush et al. |
| 2007/0265074 A1 | 11/2007 | Akahori et al. |
| 2008/0002668 A1 | 1/2008 | Asokan et al. |
| 2008/0037763 A1 | 2/2008 | Shaffer et al. |
| 2008/0046910 A1 | 2/2008 | Schultz |
| 2008/0120560 A1 | 5/2008 | Cohen et al. |
| 2008/0136895 A1 | 6/2008 | Mareachen |
| 2008/0136898 A1 | 6/2008 | Eisenberg et al. |
| 2008/0137559 A1 | 6/2008 | Sasaki et al. |
| 2008/0146339 A1 | 6/2008 | Olsen et al. |
| 2008/0181260 A1 | 7/2008 | Vonog et al. |
| 2008/0190271 A1 | 8/2008 | Taub et al. |
| 2008/0232248 A1 | 9/2008 | Barave et al. |
| 2008/0232764 A1 | 9/2008 | Vasa |
| 2008/0274810 A1 | 11/2008 | Hayashi et al. |
| 2008/0316295 A1 | 12/2008 | King et al. |
| 2009/0024963 A1 | 1/2009 | Lindley et al. |
| 2009/0033737 A1 | 2/2009 | Goose et al. |
| 2009/0036108 A1 | 2/2009 | Cho |
| 2009/0037826 A1 | 2/2009 | Bennets |
| 2009/0040289 A1 | 2/2009 | Hetherington et al. |
| 2009/0054107 A1 | 2/2009 | Feland, III et al. |
| 2009/0058984 A1 | 3/2009 | Lee |
| 2009/0074304 A1 | 3/2009 | Momosaki |
| 2009/0107320 A1 | 4/2009 | Willacy |
| 2009/0070420 A1 | 7/2009 | Morrison et al. |
| 2009/0186605 A1 | 7/2009 | Apfel et al. |
| 2009/0204906 A1 | 8/2009 | Irving |
| 2009/0209339 A1 | 8/2009 | Okada |
| 2009/0210789 A1 | 8/2009 | Thakkar |
| 2009/0249244 A1 | 10/2009 | Robinson et al. |
| 2009/0254843 A1 | 10/2009 | Van Wie |
| 2009/0257730 A1 | 10/2009 | Chen et al. |
| 2009/0288007 A1 | 11/2009 | Leacock |
| 2010/0005411 A1 | 1/2010 | Duncker |
| 2010/0010890 A1 | 1/2010 | Ditkovski et al. |
| 2010/0026780 A1 | 2/2010 | Tico et al. |
| 2010/0026802 A1 | 2/2010 | Titus et al. |
| 2010/0030578 A1 | 2/2010 | Siddique et al. |
| 2010/0095223 A1 | 4/2010 | Beers |
| 2010/0122184 A1 | 5/2010 | Vonog et al. |
| 2010/0130868 A1 | 5/2010 | Chawla |
| 2010/0146085 A1 | 6/2010 | Van Wie |
| 2010/0157096 A1* | 6/2010 | Park ................ G06F 17/30259 348/231.3 |
| 2010/0165904 A1 | 7/2010 | Woodward et al. |
| 2010/0198992 A1 | 8/2010 | Morrison et al. |
| 2010/0211872 A1 | 8/2010 | Rolston et al. |
| 2010/0257457 A1 | 10/2010 | De Goes |
| 2010/0258474 A1 | 10/2010 | Vonog et al. |
| 2010/0281375 A1 | 11/2010 | Pendergast et al. |
| 2010/0316232 A1 | 12/2010 | Acero et al. |
| 2011/0010146 A1 | 1/2011 | Buskies et al. |
| 2011/0011244 A1 | 1/2011 | Homburg |
| 2011/0055317 A1 | 3/2011 | Vonog et al. |
| 2011/0060992 A1 | 3/2011 | Jevons |
| 2011/0072366 A1 | 3/2011 | Spencer et al. |
| 2011/0078532 A1 | 3/2011 | Vonog et al. |
| 2011/0113348 A1 | 5/2011 | Twiss |
| 2011/0164141 A1 | 7/2011 | Tico et al. |
| 2011/0179180 A1 | 7/2011 | Schleifer et al. |
| 2011/0185286 A1 | 7/2011 | Moyers |
| 2011/0201414 A1 | 8/2011 | Barclay et al. |
| 2011/0209104 A1 | 8/2011 | Hinckley et al. |
| 2011/0171211 A1 | 11/2011 | Jones |
| 2011/0270922 A1 | 11/2011 | Jones |
| 2011/0279634 A1 | 11/2011 | Periyannan |
| 2011/0289422 A1 | 11/2011 | Spivack |
| 2012/0002001 A1 | 1/2012 | Prentice |
| 2012/0004950 A1* | 1/2012 | Julian .................... G06Q 10/02 705/7.32 |
| 2012/0038550 A1 | 2/2012 | Lemmey et al. |
| 2012/0038742 A1 | 2/2012 | Robinson |
| 2012/0039382 A1 | 2/2012 | Vonog et al. |
| 2012/0041859 A1 | 2/2012 | Vonog et al. |
| 2012/0060101 A1 | 3/2012 | Vonog et al. |
| 2012/0084168 A1 | 4/2012 | Adair |
| 2012/0084456 A1 | 4/2012 | Vonog et al. |
| 2012/0084672 A1 | 4/2012 | Vonog et al. |
| 2012/0084682 A1 | 4/2012 | Sirpal |

(56) References Cited

U.S. PATENT DOCUMENTS

| | | |
|---|---|---|
| 2012/0098919 A1 | 4/2012 | Tang |
| 2012/0110162 A1 | 5/2012 | Dubovik et al. |
| 2012/0110163 A1 | 5/2012 | Dubovik et al. |
| 2012/0124128 A1 | 5/2012 | Vonog et al. |
| 2012/0127183 A1 | 5/2012 | Vonog et al. |
| 2012/0151541 A1 | 6/2012 | Vonog et al. |
| 2012/0182384 A1 | 7/2012 | Anderson |
| 2012/0192087 A1 | 7/2012 | Lemmey |
| 2012/0198334 A1 | 8/2012 | Surin et al. |
| 2012/0246227 A1 | 9/2012 | Vonog et al. |
| 2012/0249719 A1 | 10/2012 | Lemmey et al. |
| 2012/0254649 A1 | 10/2012 | Vonog et al. |
| 2012/0272162 A1 | 10/2012 | Surin et al. |
| 2012/0280905 A1 | 11/2012 | Vonog et al. |
| 2012/0293600 A1 | 11/2012 | Lemmey et al. |
| 2012/0297320 A1 | 11/2012 | Lemmey et al. |
| 2012/0326866 A1 | 12/2012 | Lemmey et al. |
| 2012/0331089 A1 | 12/2012 | Vonog et al. |
| 2012/0331387 A1 | 12/2012 | Lemmey et al. |
| 2012/0331405 A1 | 12/2012 | Eidelson et al. |
| 2013/0014027 A1 | 1/2013 | Lemmey |
| 2013/0014028 A1 | 1/2013 | Lemmey et al. |
| 2013/0018960 A1 | 1/2013 | Knysz et al. |
| 2013/0019184 A1 | 1/2013 | Vonog et al. |
| 2013/0021431 A1 | 1/2013 | Lemmey et al. |
| 2013/0024785 A1 | 1/2013 | Van Wie |
| 2013/0054509 A1 | 2/2013 | Kass |
| 2013/0063542 A1 | 3/2013 | Bhat |
| 2013/0073978 A1 | 3/2013 | Butler |
| 2013/0088518 A1 | 4/2013 | Lemmey et al. |
| 2013/0097512 A1 | 4/2013 | Hong et al. |
| 2013/0102854 A1 | 4/2013 | Zheng et al. |
| 2013/0109302 A1 | 5/2013 | Levien et al. |
| 2013/0115582 A1 | 5/2013 | el Kaliouby et al. |
| 2013/0121503 A1 | 5/2013 | Ankolekar et al. |
| 2013/0123019 A1 | 5/2013 | Sullivan |
| 2013/0151333 A1 | 6/2013 | el Kaliouby et al. |
| 2013/0156093 A1 | 6/2013 | Vonog et al. |
| 2013/0169742 A1 | 7/2013 | Wu |
| 2013/0173531 A1 | 7/2013 | Rinearson |
| 2013/0191479 A1 | 7/2013 | Gottlieb |
| 2013/0201279 A1 | 8/2013 | Civinlar et al. |
| 2013/0216206 A1 | 8/2013 | Dubin |
| 2013/0239063 A1 | 9/2013 | Ubillos et al. |
| 2013/0254281 A1 | 9/2013 | Sun |
| 2013/0254287 A1 | 9/2013 | Biswas |
| 2013/0289983 A1 | 10/2013 | Park |
| 2013/0290188 A1* | 10/2013 | Olliphant ............ G06Q 20/3223 705/44 |
| 2013/0304575 A1 | 11/2013 | Fetyko |
| 2013/0321648 A1 | 12/2013 | Tamya |
| 2013/0330062 A1 | 12/2013 | Meikle et al. |
| 2014/0004496 A1 | 1/2014 | Reddy |
| 2014/0006162 A1* | 1/2014 | Ennis ................. G06Q 30/0269 705/14.58 |
| 2014/0019882 A1 | 1/2014 | Chew et al. |
| 2014/0023338 A1 | 1/2014 | Won |
| 2014/0033900 A1 | 2/2014 | Chapman et al. |
| 2014/0040784 A1 | 2/2014 | Behforooz et al. |
| 2014/0051047 A1 | 2/2014 | Bender et al. |
| 2014/0058828 A1* | 2/2014 | el Kaliouby ....... G06Q 30/0244 705/14.43 |
| 2014/0143247 A1 | 5/2014 | Rathnavelu |
| 2014/0143672 A1 | 5/2014 | Kim et al. |
| 2014/0154659 A1* | 6/2014 | Otwell ................. G09B 5/02 434/365 |
| 2014/0184723 A1 | 7/2014 | Morrison |
| 2014/0201207 A1* | 7/2014 | Sadowsky ............ A61B 5/165 707/736 |
| 2014/0229866 A1 | 8/2014 | Gottlieb |
| 2014/0229888 A1 | 8/2014 | Ko et al. |
| 2014/0301653 A1 | 10/2014 | Murphy-Chutorian |
| 2014/0304721 A1* | 10/2014 | Manuel-Devadoss ...................... H04N 21/2543 725/5 |
| 2014/0325428 A1 | 10/2014 | Lee et al. |
| 2014/0372910 A1 | 12/2014 | Mandzic et al. |
| 2015/0046800 A1 | 2/2015 | Isidore et al. |
| 2015/0052453 A1 | 2/2015 | Yu et al. |
| 2015/0106750 A1 | 4/2015 | Konami |
| 2015/0149906 A1 | 5/2015 | Toff |
| 2015/0312184 A1 | 10/2015 | Langholz |
| 2016/0142495 A1 | 5/2016 | Lin |
| 2017/0006008 A1* | 1/2017 | Moran ................. H05K 999/99 |

FOREIGN PATENT DOCUMENTS

| | | |
|---|---|---|
| EP | 0721726 | 12/2000 |
| EP | 2471221 | 7/2012 |
| EP | 2484091 | 8/2012 |
| EP | 2630630 | 8/2013 |
| EP | 2636194 | 9/2013 |
| GB | 2446529 | 8/2008 |
| WO | 2009077936 | 6/2009 |
| WO | 2011025989 | 3/2011 |
| WO | 2011041229 | 4/2011 |
| WO | 2012021173 | 2/2012 |
| WO | 2012021174 | 2/2012 |
| WO | 2012021901 | 2/2012 |
| WO | 2012054089 | 4/2012 |
| WO | 2012054895 | 4/2012 |
| WO | 2012060977 | 5/2012 |
| WO | 2012060978 | 5/2012 |
| WO | 2012103376 | 8/2012 |
| WO | 2012135384 | 10/2012 |
| WO | 2012151471 | 11/2012 |
| WO | 2012177641 | 12/2012 |
| WO | 2012177779 | 12/2012 |
| WO | 2013343207 | 3/2013 |
| WO | 2013149079 | 10/2013 |

OTHER PUBLICATIONS

CrunchBase Profile, CrunchBase readeo, http://www.crunchbase.com/company/readeo, retrieved Feb. 3, 2011, pp. 1-2.
CrunchBase Profile, CrunchBase Rounds, http://www.crunchbase.com/company/6rounds, retrieved Feb. 4, 2011, pp. 1-2.
CrunchBase Profile, CrunchBase TokBox, http://www.crunchbase.com/company/tokbox, retrieved Feb. 4, 2011, pp. 1-3.
Online Collaboration GoToMeeting, http://www.gotomeeting.com/fec/online_collaboration, retrieved Feb. 4, 2011, pp. 1-4.
Readeo Press Release, http://www.mmpublicity.com, Feb. 25, 2010, pp. 1-2.
Rounds.com, Make friends online and enjoy free webcame chats, http://www.rounds.com/about, retrieved Feb. 4, 2011, pp. 1-3.
2011 Blackboard Collaborate User's Guide.
2007 WebEx Meeting Center User's Guide.
MacDonald, Heidi—Shindig Offers Authors Interactive Video Conferencing—Blog posted Sep. 12, 2012—Publishers Weekly. Retrieved from [http://publishersweekly.com] on [Aug. 15, 2016]. 5 Pages.
Shindig, Various Informational Pages Published as of Jul. 21, 2012—Retrieved via Internet Archive from [http://shindigevents.com] on [Aug. 5, 2016].
Slideshare—Shindig Magazine Video Chat Events. Slide Presentation published Oct. 9, 2012. Retrieved from [http://slideshart.net] on [Aug. 11, 2016]. 11 Pages.
Miyoshi et al. "Input device using eye tracker in human-computer interactions," Robot and Human Interactive Communication, 2001 Proceedings, 10th IEEE International, pp. 580-585.
Robin Wauters, "6rounds Launches Video Communication Platform With Several Layers of Fun," TechCrunch, Jun. 30, 2009, pp. 1-2, http://techcrunch.com/2009/06/30/6rounds-launches-video-communication-plaffrom-with-several-layers-of-fun/, accessed on Feb. 10, 2010.
"6rounds has officially launched!" 6rounds.com Blog, Jul. 3, 2009, pp. 1-4, http://blog.6rounds.com/official-launch-video-chat-website/, accessed on Feb. 10, 2010.

(56) References Cited

OTHER PUBLICATIONS

"The Gix00 Team on TV!" 6rounds.com Blog, Sep. 22, 2008, pp. 1-4, http://blog.6rounds.com/gixoo-tv-coverage-startup-factory!, accessed on Feb. 10, 2010.
Ustream Profile, Ustream, http://www.ustream.tv/help, retrieved Jul. 11, 2014, pp. 1-3.
Cisco, "Audio Controls Guide and Release Notes for FR29," Cisco WebEx User Guide, pp. 1-11.
Lu, et al—CuteChat: A Lightweight Tele-immersive Video Chat System . . . Nov. 28-Dec. 1, 2011, Scottsdale, Arizona, USA. ACM 978-1-4503-0616-4/11/11. p. 1309-1312.
O'Hara et al. Blended Interaction Spaces for Distributed Team Collaboration. ACM Trans. Comput.-Hum. Interact. 18, 1, Article 3 (Apr. 2011), 28 pages.
Roussel et al. Beyond "Beyond Being There": Towards Multiscale Communication Systems. Proceedings MM'07, Sep. 23-28, 2007, Augsburg, Bavaria, Germany. Copyright 2007 ACM 978-1-59593-701-08/07/2009. p. 238-246.
Junuzovic et al. Requirements and Recommendations for an Enhanced Meeting Viewing Experience. Proceedings MM'08, Oct. 26-31, 2008, Vancouver, British Columbia, Canada. Copyright 2008 ACM 978-1-60558-303-7/08/10. p. 539-548.
Yao et al. FocalSpace: Multimodal Activity Tracking, Synthetic Blur and Adaptive Presentation for Video Conferencing. Proceedings SUI'13, Jul. 20-21, 2013, Los Angeles, California, USA. Copoyright ACM 978-14503-2141-9/13/07. p. 73-76.
Examus procturing for Open edX from Raccoon Gang, https://raccoongang.com/blog/examus-proctoring-open-edx-raccoon-gang/, accessed on Jun. 12, 2017.

* cited by examiner

IMAGE AND IDENTITY VALIDATION IN VIDEO CHAT EVENTS

BACKGROUND OF THE INVENTION

This generally relates to systems and methods for performing image and/or identity validation in online testing and online events to enhance an events security. In particular, this may be an effective tool for a proctor or host to confirm the identity of an individual within a test/exam setting, as well as in any other scenario where attendance may be taken or identity verification may be beneficial. This may also be particularly useful to a business owner that is conducting a meeting and wants to be sure of whom they are talking to.

In today's electronic world, many activities that were done in person, are now being handled online. For example, many people have business meetings online and take classes online. Before the use of the Internet, verifying the identity of the individual being spoken to was trivial in face-to-face scenarios. Now, unfortunately, it is becoming increasingly more difficult to verify who you are dealing with online.

Because of the increased importance of verification of identity online, it would be beneficial to have systems and methods that allow persons to verify the identity of individuals that are participating in an online event.

SUMMARY OF THE INVENTION

This disclosure is generally directed to systems and methods for performing image and/or identity validation in online testing and online events to enhance an events security.

When conducting an event (i.e. a school administered test) the proctor, host or administrator may find it necessary or desirable for participants to act under real identities. For example, students taking an exam using a mobile computing device (i.e. a laptop or computer) using software (i.e. Exam 4®) would first put in identifying information (Student name, number, the subject of the class, the number of the class etc.). Once the student has input all of the identifying information into the software, the mobile computing device would then take a still image of the student taking the test. It is important to note that a person having ordinary skill in the art would recognize that the still image can be taken before the student puts in their identifying information. This still image would then be compared to a list of stored images and/or images found on the Internet. If there is a match between the image taken from the mobile computing device and a stored image (and/or image found on the Internet), the name associated with the stored image will be checked against the image inputted by the student. If there is a match between the information inputted by the student and the information associated with the stored image, the student's identity has been verified. If there is no match, the still image taken by the mobile computing device will be flagged for the proctor, host or administrator of the test.

In another embodiment, the mobile computing device may take multiple still images of the student taking the exam further verify the test taker's (student's) identity.

In another embodiment, the mobile computing device may take a still image of the student a randomly selected time during the exam. This image may be either verified immediately, or verified when the student is submitting their exam.

In another embodiment, when the student inputs their name into the software, the name may then be placed into an Internet search engine (i.e. Google®). A series of photos associated with the inputted name would then be compared to a still image taken by the mobile computing device. If there is a match between the images found on the Internet and the image provided by the mobile computing device, the student's identity has been verified.

When conducting an online event, a participant in the online event may want to verify the identity of an individual within the online event. In some embodiments, an image of the individual may be captured from a video stream of the online event. Once the image is captured, that image may be compared to a plurality of stored images. If a match between the captured image and a stored image exists, a name associated with that stored image may be retrieved. This retrieved name may then be compared to a name provided by the individual with whom the image has been captured. If there is a determined match between the name associated with the stored image and the name provided by the individual, the identity of the individual may be said to have been verified. If the retrieved name associated with the stored image does not match the name inputted by the individual, a notification may be sent to a participant who is verifying the identity of the individual or host of the online event.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION OF THE INVENTION

The present invention may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features. Furthermore, in at least some embodiments, liked referenced numerals refer to like parts throughout.

Figure 1A:
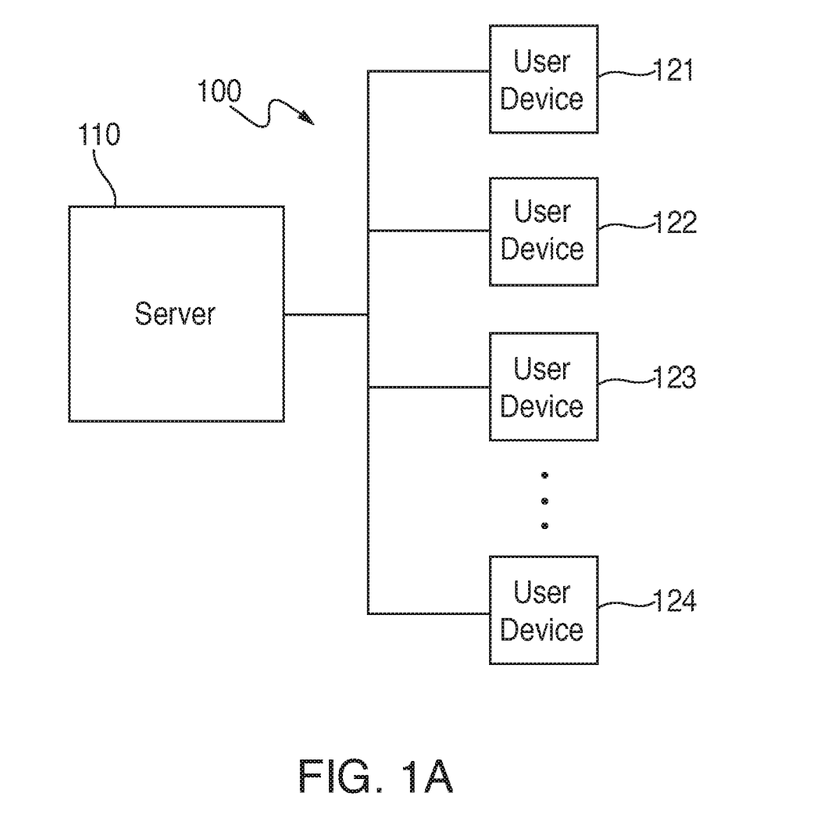
FIG. 1A is a schematic view of an illustrative communications system in accordance with various embodiments.

FIG. 1A is a schematic view of an illustrative communications system in accordance with various embodiments. In some embodiments, a communications system may facilitate communications between user devices. Communications system 100 may include at least one server 110. Server 110 can be any suitable server for facilitating communications between two or more users devices. For example, server 110 may include several interconnected computers running software to control communications.

Communications system 100 may include several user devices 121-124. Server 110 may be coupled with user devices 121-124 through any suitable network. For example, server 110 may be coupled with user devices 121-124 through Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP ("VOIP")), any other communications protocol, or any combination thereof. Each of user devices 121-124 may include an electronic device (e.g., a personal computer or a personal communications system). In some embodiments, each user device may correspond to a single user. For example, user device 121 may correspond to a first user and user device 122 may correspond to a second user. Server 110 may control communications between two or more of the user devices. For example, server 110 may control one-to-one communications between user device 121 and 122 and/or multi-party communications between user device 121 and user devices 122-124. Each user device may provide outputs to a user and receive inputs from the user when facilitating communications. For example, a user device may include one or more output interfaces (e.g., display screen or audio output) for providing communication outputs to a user and one or more input interfaces (e.g., a controller, joystick, keyboard, or mouse) for receiving communication inputs from a user.

While only one server and four user devices (e.g., devices 121-124) are shown in FIG. 1A, it is understood that any number of servers and user devices can be provided in a communications system. A more detailed description of a user device 121 can be found in the description of FIG. 1B below. A more detailed description of suitable communications systems for facilitating user communications can be found in commonly assigned U.S. Pat. No. 8,405,702, which issued on Mar. 26, 2013, commonly assigned U.S. Pat. No. 8,390,670, which issued on Mar. 5, 2013, commonly assigned U.S. Pat. No. 8,902,272, which issued on Dec. 2, 2014, commonly assigned U.S. Pat. No. 8,917,310, which issued on Dec. 23, 2014, and commonly assigned U.S. Pat. No. 9,041,768, which issued on May 26, 2015, is the disclosures of each hereby incorporated herein by reference in their entirety.

In accordance with the present disclosure, a communications system may facilitate online events that may be recorded by any of the various users using a video editing tool. As used herein, the video editing tool may be any software, hardware, or combination of software and hardware stored on user devices 121-124 and/or server 110 that allows a user to perform one or more video editing techniques or actions. Online events, as described herein, may include, but not limited to, online classes, online chat forums, conferences, presentations, lectures, meetings, concerts, and personalized gatherings. While it is understood that many online events may include one or more video feeds, online events, as described herein, may include one or more video feeds, audio feed, or both video and audio feeds. Video, as described herein, is not limited to solely video data, but may also include audio data.

Figure 1B:
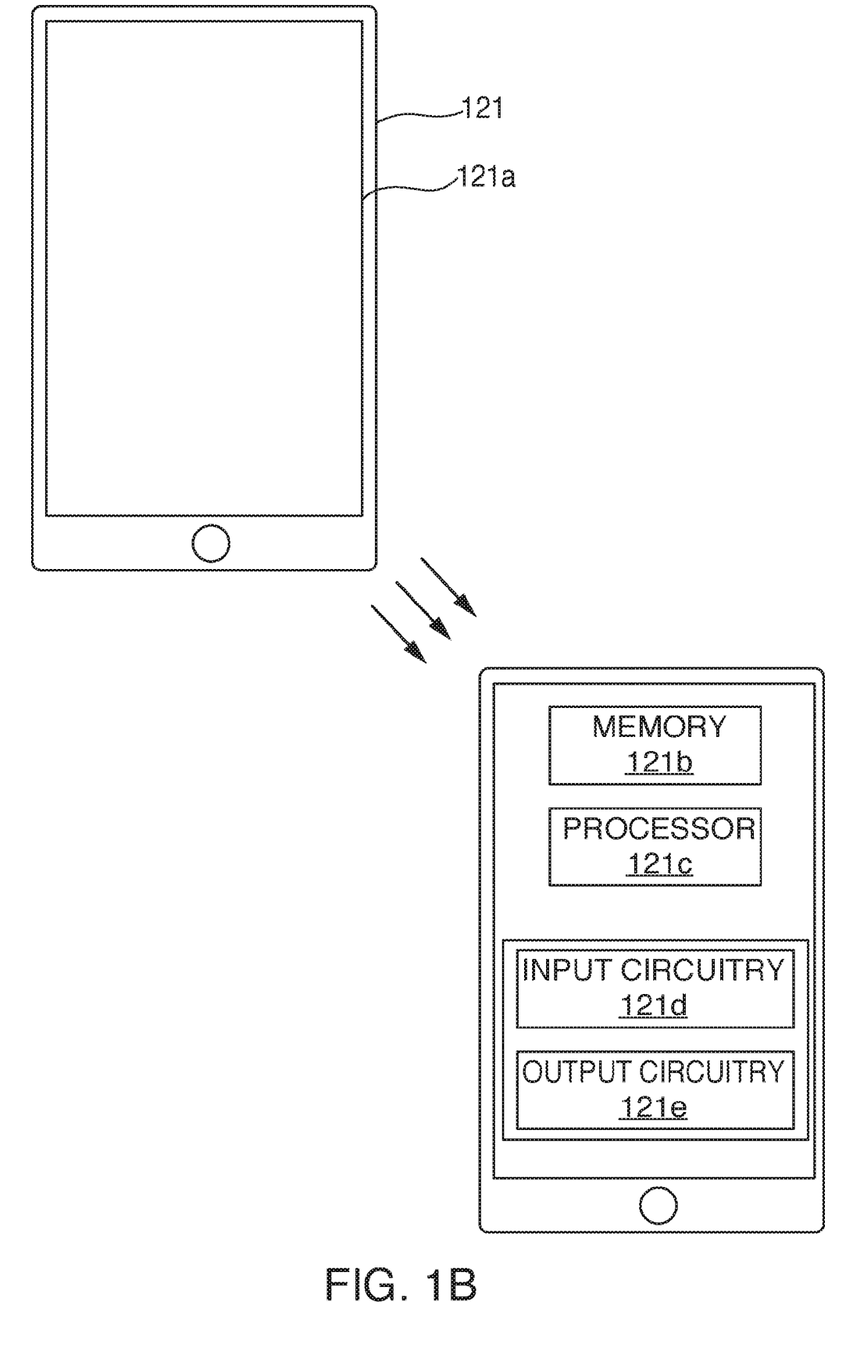
FIG. 1B is an illustrative diagram of an exemplary device in accordance with various embodiments.

FIG. 1B is an illustrative diagram of an exemplary device in accordance with various embodiments. Device 121, in some embodiments, may correspond to any electronic device or system. Various types of devices include, but are not limited to, portable media players, cellular telephones or smart phones, pocket-sized personal computers, personal digital assistants ("PDAs"), desktop computers, laptop computers, tablet computers, and/or electronic accessory devices such as smart watches and bracelets. In some embodiments, however, device 200 may also correspond to a network of devices.

Device 121, in some embodiments, may include display screen 121a, memory 121b, one or more processors 121c, input circuitry 121d, and output circuitry 121e. Persons of ordinary skill in the art will recognize that device 121 may include any number of components, and one or more additional components or modules may be added or omitted without deviating from the scope of the present disclosure. Additionally, one or more components may be combined or separated, and multiple instances of various components are also possible, however only one of each component is shown within device 200 for simplicity.

Display screen 121a may include any suitable mechanism and/or component for displaying inputs from a user or displaying outputs from the device 121. In some embodiments, display screen 121a may work with input circuitry 121d and output circuitry 121e. Display 121a may be any size and may be located on one or more regions/sides of device 121. For example, display 121a may fully occupy a first side of device 121, or may occupy a portion of the first side. Various display types may include, but are not limited to, liquid crystal displays ("LCD"), monochrome displays, color graphics adapter ("CGA") displays, enhanced graphics adapter ("EGA") displays, variable graphics array ("VGA") displays, or any other display type, or any combination thereof. In some embodiments, display 121a may be a touch screen and/or an interactive display. In some embodiments, the touch screen may include a multi-touch panel coupled to processor 121c. In some embodiments, display 121a may be a touch screen and may include capacitive sensing panels. In some embodiments, display 121a may also correspond to a component of input interface 121s, as it may recognize touch inputs.

Memory 121b may include any suitable form of memory, such as cache memory, semi-permanent memory (e.g., RAM), or any other memory type, or any combination of. In some embodiments, memory 121b may be used in place of and/or in addition to an external memory or storage unit or device for storing data on device 121. Memory 121b may also include, or may correspond to, one or more storage mediums. Various types of storage mediums may include, but are not limited to, hard-drives, solid state drives, flash memory, permanent memory (e.g., ROM), or any other storage type, or any combination thereof. Any form of data or content may be stored within storage memory 121b, such as photographs, music files, videos, contact information, applications, documents, or any other file, or any combination thereof.

Processor(s) 121c may include any suitable processing circuitry, such as one or more processors, capable of controlling the operations and functionality of device 121. In some embodiments, processor(s) 121c may facilitate communications between various components within device 121. For example, processor(s) 121c may cause output circuitry 121e to perform an associated output in response to one or more inputs being received by input circuitry 121d. Processor(s) 121c may also run an operating system for device 121, applications resident on device 121, firmware applications, media application, and/or any other type of application, or any combination thereof functioning on, or in conjunction with, device 121.

Input circuitry 121d may include any suitable mechanism and/or component for receiving inputs from a user operating device 121. In some embodiments, input circuitry 121d may operate through the use of a touch screen and/or an interactive touch sensitive display screen. For example, input circuitry 121d may operate through the use of a multi-touch panel coupled to processor(s) 121c, and may include one or more capacitive sensing panels. In some embodiments, input circuitry may include a camera. In some embodiments, input circuitry 121d may also correspond to a component or portion of output circuitry 121e which also may be connected to a touch sensitive display screen. For example, in response to detecting certain touch inputs, input circuitry 230 and processor(s) 121c may execute one or more functions for device 121 and/or may display certain content using output circuitry 121e.

Output circuitry 121e may include any suitable mechanism or component for generating outputs to a user operating device 121. Output circuitry 121e may include communications circuitry operable to communicate with one or more devices. The communication circuitry may also be able to communicate with servers and the internet. Output circuitry 121e may operate display screen 121a, and may be any size or shape, and may be located on one or more regions/sides of device 121. For example, output circuitry 121e may operate display screen 121a that may fully occupy a first side of device 121. Output circuitry 121e may also operate display screen 121a that may only occupy a portion of a first side of device 121. In some embodiments, output interface 121e may include speaker. Speakers, as used herein, may correspond to any suitable mechanism for outputting audio signals. For example, speakers may include one or more speaker units, transducers, or array of speakers and/or transducers capable of broadcasting audio signals and audio content to a room where device 121 may be located. In some embodiments, speakers may correspond to headphones or ear buds capable of broadcasting audio directly to a user.

Figure 2A:
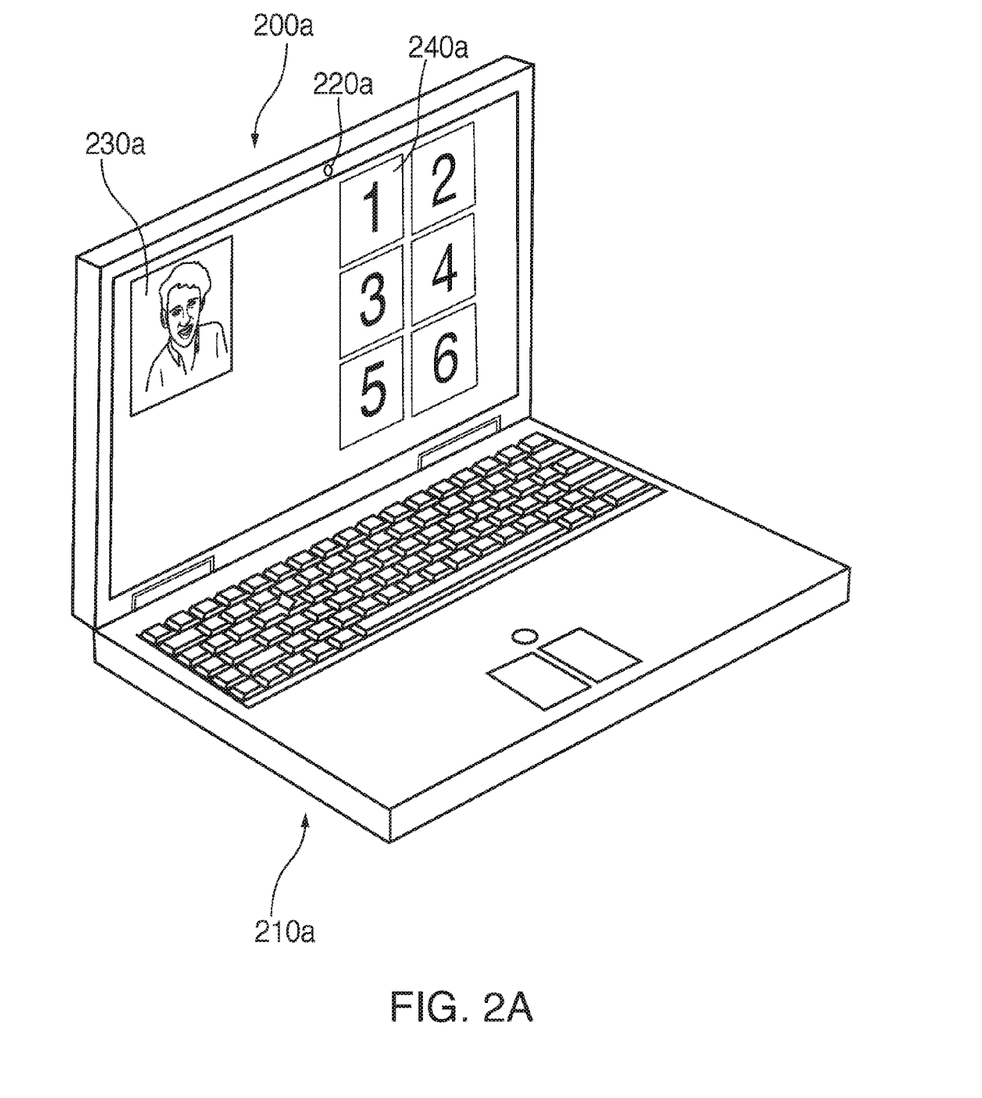
FIG. 2A is an illustrative diagram of a laptop participating in an interactive online event in accordance with various embodiments.

FIG. 2A is an illustrative diagram of a mobile computing device being used to participate in an interactive online event. In some embodiments, an individual my access an interactive online event 200a using mobile computing device 210a. While a mobile computing device, such as a laptop computer, is shown in FIG. 2A, a person having ordinary skill in the art will recognize that the use of a laptop is merely exemplary and can be replaced with any electronic device or system. Mobile computing device 210a may include a camera 220a. This camera while shown on mobile computing device 210a, may be separate from the laptop and simply connected through a wired or wireless connection. Camera 220a may capture streaming video presenting on a display screen of mobile computing device 210a via streaming video display 230a. Streaming video display 230a may be shared with the some or all of the participants 240a in interactive online event 200a.

Figure 2B:
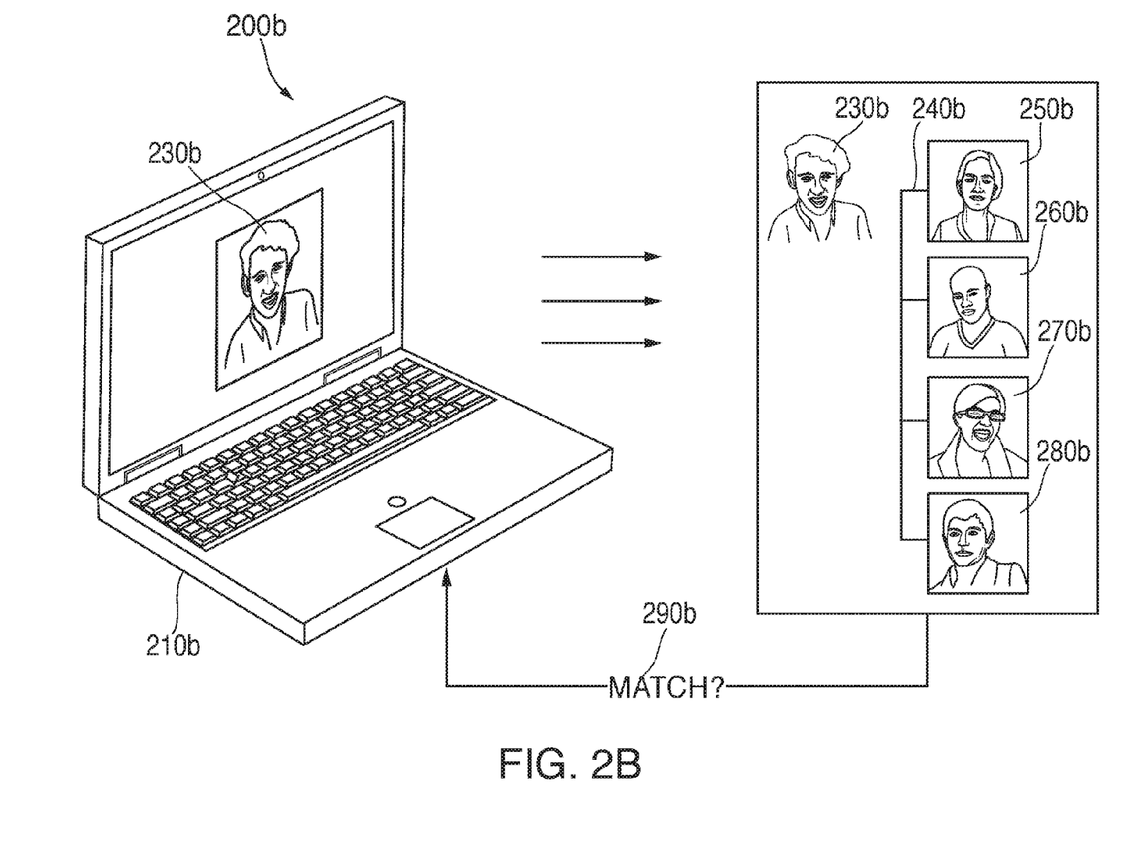
FIG. 2B is an illustrative diagram in which the identity of a user accessing an interactive online event is being verified in accordance with various embodiments.

FIG. 2B is an illustrative diagram in which the identity of a user accessing an interactive online event is being verified. System 200b shows a system for verifying a user's identity. In system 200b, a user may use mobile computing device 210b to access an online event. While a mobile computing device, such as a laptop, is shown in FIG. 2B, a person having ordinary skill in the art will recognize that the use of a laptop is merely exemplary and can be replaced with any electronic device or system. Mobile computing device 210b may include a camera 220b. This camera while shown on laptop 210b, may, in some embodiments, be separate from mobile computing device 210b, and may be connect to mobile computing device 210b through a wired or wireless connection. Camera 220b may capture a streaming video 230b of the user. To verify the identity of the user accessing the interactive online event, the a still image of streaming video 230b may be captured.

Once the still image is captured, the still image may then be compared to a plurality of stored images 240b. To recognize and compare images, system 200b may look for patterns and/or sequences in numerical data. In a captured image, each part of the image includes pixels. A pixel is a minute area of illumination on a display screen. The system interprets each image's pixels as a series of numbers. To identify each image, the system may identify images by matching it with images having similar numerical series. If an image has a similar numerical series as another image, then there is a match. So, the system may interpret the captured image 230b's pixels. These pixels may then be compared to the pixels of stored images 240b. If there is a match, the system may send a notification 290b to the individual accessing the online event, a host or administrator of the online event, or a teacher/proctor for the online event.

Figure 3:
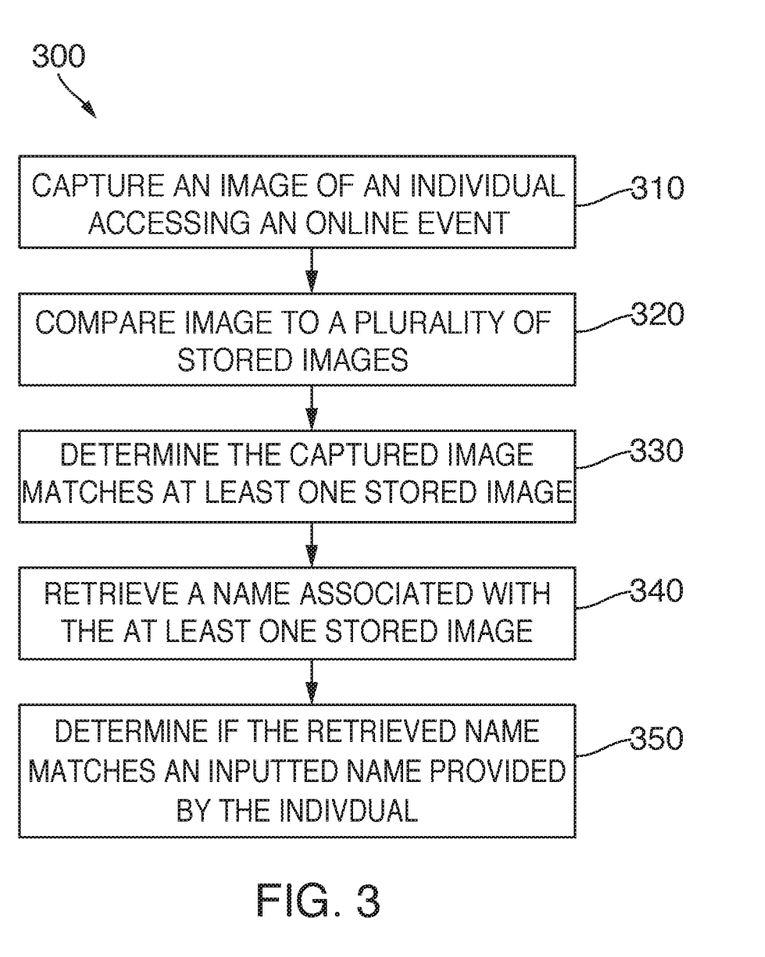
FIG. 3 is an illustrative flowchart of a process for verifying the identity of a user accessing an interactive online event in accordance with various embodiments.

FIG. 3 is an illustrative flowchart of a process 300 for verifying the identity of a user accessing an interactive online event. Process 300, may in some embodiments start at step 310. At step 310, an image is captured from an individual from a video stream of an online event. In some embodiments, the online event may be hosted on server 110 and displayed on each user device 121-124. Thus, each user device 121-124 may present the online event on their own display screen, and each user device 121-124 may capture an image of an individual accessing the online event. This image may be stored in memory of a device an individual is using to access the online event. The image may also be stored on server 110. In some embodiments, an image may be captured through the use of a camera.

At step 320, the captured image is compared to a plurality of stored images. If the captured image is stored on a user device, then the image may have to be transmitted to a server for comparison purposes. The plurality of stored images may be stored on a user device or a server. To compare images the captured image to a plurality of stored images, the system may look for patterns and/or sequences in numerical data. In a captured image, each part of the image includes pixels. A pixel is a minute area of illumination on a display screen. The system interprets each image's pixels as a series of numbers. To identify each image, the system may identify images by matching it with images having similar numerical series. While only one method of comparing images is used, persons of ordinary skill in the art will recognize that any number of methods may be used to compare images and the above example is non-limiting and merely exemplary.

At step 330, the server then determines that the captured image matches at least one stored image from the plurality of stored images. If the captured image is similar enough to the stored image, the server may determine that there is a match. In some embodiments, the captured image may not match a stored image. If this is the case, the server will determine that no match exists and the identity is not verified. In some embodiments, process 300 may repeat itself to try the verification process with a second picture.

At step 340, the server retrieves a name associated with the at least one stored image. Once the stored image is matched to the captured image, the name associated with the stored image is retrieved to complete the verification process. In some embodiments, the stored name may include different iterations of the name. For example, the stored name include nicknames, maiden names, and middle names. This would allow the system to recognize different inputted names associated with the captured image.

At step 350, the server determines if the retrieved name from the stored image matches an inputted name provided by the individual accessing the online event. If the name matches, the individual's identity has been verified. If the name does not match, the person who is trying to verify the individual's identity accessing the online event may receive a notification that the names do not match. A notification is described in more detail in FIGS. 4 and 6. In some embodiments, a notification may be sent to the host if there was a match. In some embodiments, a notification may be sent to the individual if there was a match. In some embodiments, if the identity is not verified, the person associated with the inputted name may receive a notification. A more detailed explanation of this is in the description of FIGS. 5 and 6.

Figure 4:
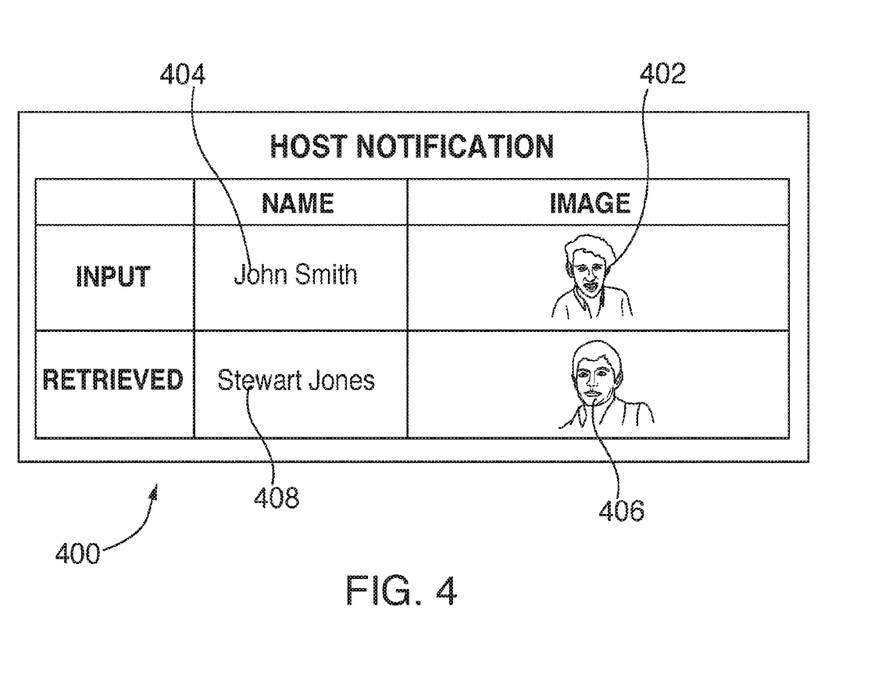
FIG. 4 is an illustrative diagram of an exemplary host notification in accordance with various embodiments.

FIG. 4 is an illustrative diagram of an exemplary host notification 400 in accordance with various embodiments. Host notification 400, in some embodiments, may include inputted name 404, captured image 402, retrieved image 406, and retrieved name 408 associated with the retrieved image. In some embodiments, host notification 400 may only include captured image 402 and inputted name 404. Host notification 400 may be sent to the host of an online event if there is an unverified individual in the online event. Host notification may be sent to the host of an online event if there is a verified match of the individual in the online event.

Captured image 402 may be similar to the image captured in process 300 and the same description applies. Captured image 402 may be similar to the still captured from streaming video 230b and the same description applies.

Inputted name 404 may be the name inputted by the individual accessing the interactive online event. In some embodiments, if there is no match with the images, but there is a match with the inputted name and a stored name, the inputted name along with the captured image would allow the host to see if there is someone impersonating an individual. Inputted name 404 may be similar to the inputted name in process 300 and the same description applies.

Stored image 406 may be a stored image in a database. In some embodiments, stored image 406 may match captured image 402. Stored image 406 may be similar to the stored image in process 300 and the same description applies.

Retrieved name 408 is a name associated with stored image 406. Once stored image 406 is selected for the host notification, retrieved name 408 associated with stored image 406 is retrieved. Retrieved name 408 may be similar to the retrieved name associated with the stored image in process 300 and the same description applies.

Figure 5:
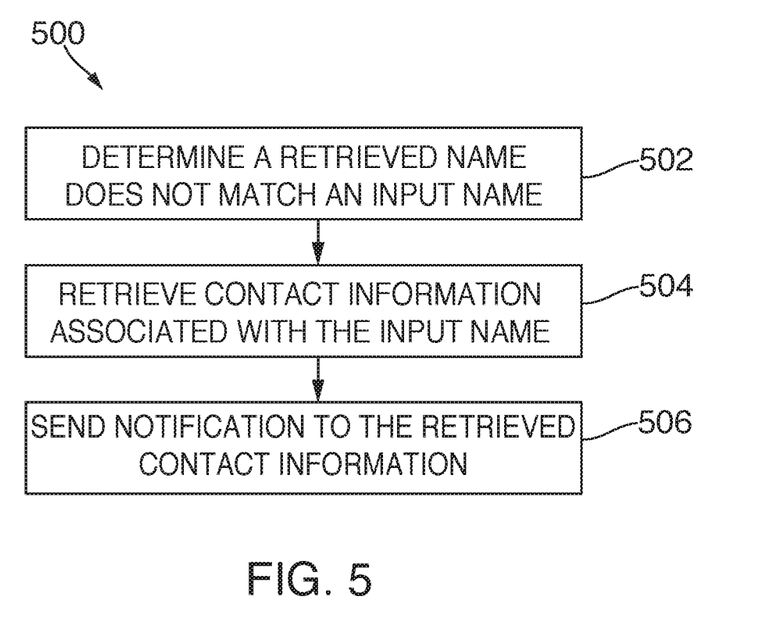
FIG. 5 is an illustrative flow chart of a process for sending a notification in accordance with various embodiments.

FIG. 5 is an illustrative flow chart of a process 500 for sending a notification in accordance with various embodiments. Process 500 may start with step 502. At step 502, a server determines that a retrieved name does not match an input name. Once a captured image is matched to a stored image, the server may then compare the name associated with the stored image to the name inputted by an individual. This may be caused by a typographical error or may be a different person entirely. In some embodiments, if there is not a match between the captured image and a stored image, but there is a match between names, the system may determine that an impersonator is attempting to access the online event under a name. If this is the case, a notification may be sent to the contact information associated with the stored image and name alerting the individual that a person is attempting to use their name. In another embodiment, the server may notice that a name is being used by two individuals. A notification may be sent out to the contact information associated with the stored image and name.

At step 504, contact information associated with the input name is retrieved. Once it is determined that the inputted name and the retrieved name do not match, the contact information associated with the input name is retrieved. This contract information may be an e-mail address, phone number, personal address, business address or any other method of contacting the inputted name.

At step 506 a notification is sent to the retrieved contact information. Once the contact information is retrieved, a notification may be sent to the individual. A more detailed description of the notification may be found in FIG. 6.

Figure 6:
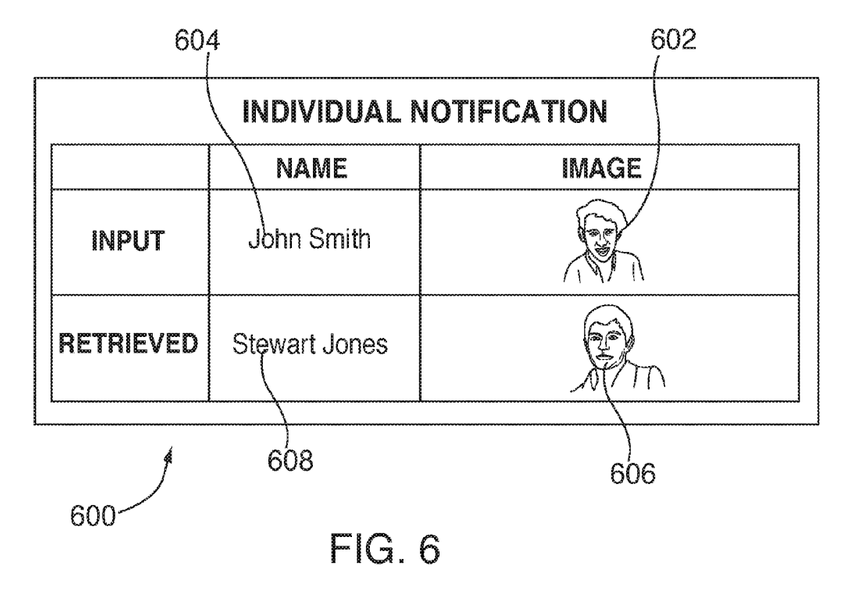
FIG. 6 is an illustrative diagram of an exemplary individual notification in accordance with various embodiments.

FIG. 6 is an illustrative diagram of an exemplary individual notification 600 in accordance with various embodiments. Individual notification 600, in some embodiments, may include inputted name 604, captured image 602, retrieved image 606, and retrieved name 608 associated with the retrieved image. In some embodiments, individual notification 600 may only include captured image 602 and inputted name 604. Individual notification 600 may be sent to the individual accessing the an online event if there is an unverified name. Individual notification 600 may also be sent to the contact information associated with a retrieved name if the names match, but the images do not. Individual notification may be sent to the individual if there is a verified match of the individual in the online event.

Captured image 602 may be similar to the image captured in process 300 and the same description applies. Captured image 602 may be similar to the still captured from streaming video 230b and the same description applies.

Inputted name 604 may be the name inputted by the individual accessing the interactive online event. In some embodiments, if there is no match with the images, but there is a match with the inputted name and a stored name, the inputted name along with the captured image would allow the host to see if there is someone impersonating an individual. Inputted name 604 may be similar to the inputted name in process 300 and the same description applies.

Stored image 606 may be a stored image in a database. In some embodiments, stored image 406 may match captured image 402. Stored image 606 may be similar to the stored image in process 300 and the same description applies.

Retrieved name 608 is a name associated with stored image 606. Once stored image 606 is selected for the host notification, retrieved name 608 associated with stored image 406 is retrieved. Retrieved name 608 may be similar to the retrieved name associated with the stored image in process 300 and the same description applies.

Figure 7:
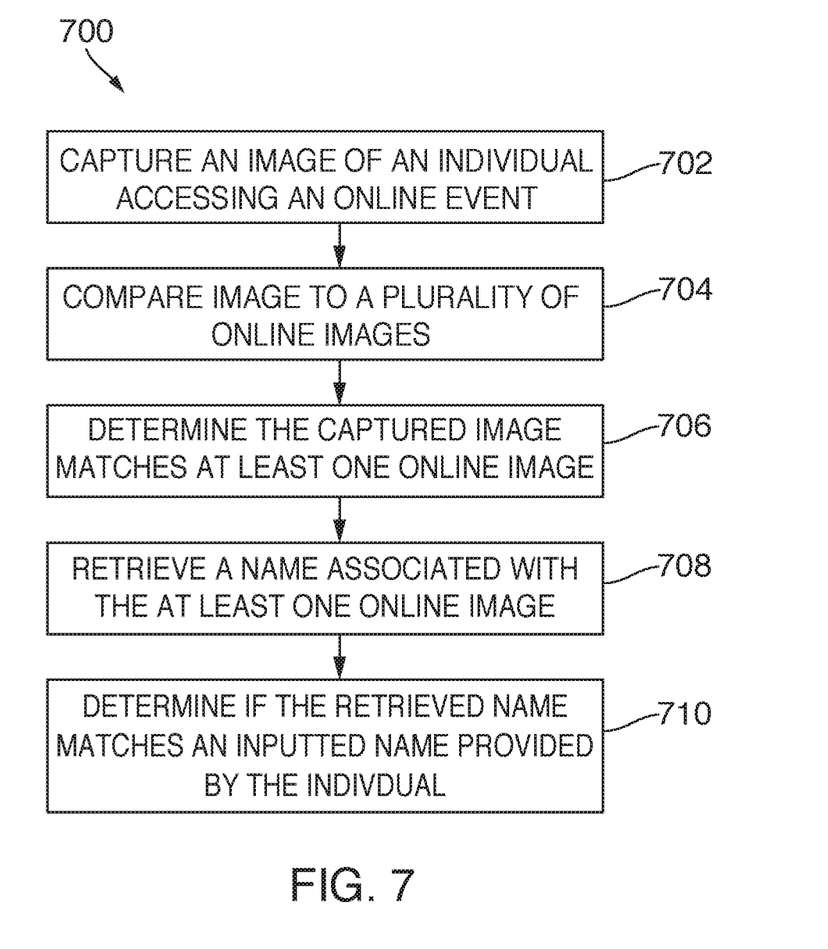
FIG. 7 is an illustrative flowchart of a process for verifying the identity of a user accessing an interactive online event in accordance with various embodiments.

FIG. 7 is an illustrative flowchart of a process 700 for verifying the identity of a user accessing an interactive online event in accordance with various embodiments. Process 700, may in some embodiments start at step 702. At step 702, an image is captured from an individual accessing an online event. In some embodiments, the online event may be hosted on server 110 and displayed on each user device 121-124. Thus, each user device 121-124 may present the online event on their own display screen, and each user device 121-124 may capture an image of an individual accessing the online event. This image may be stored in memory of a device an individual is using to access the online event. The image may also be stored on server 110. In some embodiments, an image may be captured through the use of a camera.

At step 704, the captured image is compared to a plurality of online images. The online images may come from databases on the internet. Some of these sources include, but are not limited to, LinkedIn, Facebook, Twitter, Instagram, Snapchat, and dating websites. This list is not exhaustive and not limiting. Persons of ordinary skill in the art will recognize that this list is not exhaustive, not limiting and merely exemplary. To compare images the captured image to a plurality of stored images, the system may look for patterns and/or sequences in numerical data. In a captured image, each part of the image includes pixels. A pixel is a minute area of illumination on a display screen. The system interprets each image's pixels as a series of numbers. To identify each image, the system may identify images by matching it with images having similar numerical series. While only one method of comparing images is used, persons of ordinary skill in the art will recognize that any number of methods may be used to compare images and the above example is non-limiting and merely exemplary.

At step 706, the server then determines that the captured image matches at least one online image from the plurality of online images. If the captured image is similar enough to the online image, the server may determine that there is a match. In some embodiments, the captured image may not match an online image. If this is the case, the server will determine that no match exists and the identity is not verified. In some embodiments, process 700 may repeat itself to try the verification process with a second picture.

At step 708, the server retrieves a name associated with the at least one online image. Once the online image is matched to the captured image, the name associated with the online image is retrieved to complete the verification process. In some embodiments, the stored name may include different iterations of the name. For example, the stored name include nicknames, maiden names, and middle names. This would allow the system to recognize different inputted names associated with the captured image.

At step 710, the server determines if the retrieved name from the stored image matches an inputted name provided by the individual accessing the online event. If the name matches, the individual's identity has been verified. If the name does not match, the person who is trying to verify the individual's identity accessing the online event may receive a notification that the names do not match. A notification is described in more detail in FIGS. 4 and 6. In some embodiments, a notification may be sent to the host if there was a match. In some embodiments, a notification may be sent to the individual if there was a match. In some embodiments, if the identity is not verified, the person associated with the inputted name may receive a notification. A more detailed explanation of this is in the description of FIGS. 5 and 6.

In another embodiment, a notification may be provided to the individual that their identity is being verified. The notification may include whether the individual's identity was verified. The notification may, in some embodiments, be sent to an administrator or host of the online event, or to a teacher or proctor of the online event.

An image of an individual within a video chat event may be captured, and compared with publicly available images (e.g., available on the Internet), as well as with a local database of images. The comparison of the captured image with publicly available images and/or locally stored images may allow a system to confirm or validate the identity of the individual captured by the image. The system may also be able to determine if an individual is not identifiable using tagged images from the Internet or a local database. As one example, an image of an individual may be compared with images available online. If a match is determined to exist between the captured image and the image online, information about the individual from the online image, such as a tagged name, username, or email, may be extracted. This information may then be used to identify the individual within the video chat to determine whether or not the individual is who the individual says they are.

In some embodiments, the system may also listen to audio from a keyboard or other input mechanism on a user device to determine if such inputs are consistent with a particular action or activity the individual is supposed to be performing with their user device. This may enable the system to determine whether an individual is using their device for some activity not related to an intended experience. Furthermore, a notification may be provided to the host of the video chat event by the system if such a mismatch or discrepancy is detected.

In some embodiments, the system may also monitor microphone levels and/or speaker levels, to determine whether or not sounds are being detected that do not pertain, or are not associated with, audio related to the video chat event. In this way, the system may also provide a notification to the host that the individual is involved in or inquiring outside audio inputs that are not sanctioned by the video chat event.

This process may be particular useful in such scenarios as testing to ensure that the individual(s) taking the test are actually the individuals who should be taking the test.

In another embodiment, the system may capture the image of the user from the video and analyze the background or corresponding scenery from the captured image to determine a location of the user. This location may be used to determine if users are located in the same area.

It should be appreciated that the various embodiments described above can be implemented by software, but can also be implemented in hardware or a combination of hardware and software. The various systems described above can also be embodied as computer readable code on a computer readable medium. The computer readable medium can be any data storage device that can store data, and that can thereafter be read by a computer system. Examples of computer readable mediums include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The above described embodiments of the invention are presented for purposes of illustration and not of limitation.

What is claimed is:

1. A method for validating an identity of an individual within an online event, the method comprising:
capturing an image of the individual from a video stream of the online event;
comparing the captured image to a plurality of stored images;

determining that the captured image matches a first stored image from the plurality of stored images;
retrieving a name associated with the the first stored image;
determining if the retrieved name matches an inputted name provided by the individual, wherein a first notification is sent to a host of the online event if the retrieved name and the inputted name do not match;
determining that the captured image does not match a second stored image of the plurality of stored images;
determining that the inputted name matches a name associated with the second stored image;
retrieving contact information associated with the inputted name; and
sending a second notification to the retrieved contact information.

2. The method of claim 1, wherein the first notification comprises:
the inputted name;
the captured image;
the name associated with the first stored image; and
the stored image.

3. The method of claim 1, further comprising:
determining the retrieved name does not match the inputted name; and
disconnecting the individual from the online event.

4. The method of claim 1, wherein the second notification comprises:
the inputted name;
the captured image;
the name associated with the second stored image; and
the stored image.

5. The method of claim 1, further comprising:
sending a third notification to the individual that their identity has been verified.

6. The method of claim 1, wherein the online event is an examination for an online class.

7. A method for validating an identity of an individual within an online event, the method comprising:
capturing an image of the individual from a video stream of the online event;
comparing the captured image to a plurality of online images, wherein the online images are located on at least one online database;
determining that the captured image matches at least one online image of the plurality of online images;
retrieving a name associated with the at least one online image;
determining if the retrieved name matches an inputted name provided by the individual, wherein a first notification is sent to a host of the online event if the retrieved name and the inputted name do not match;
determining the retrieved name does not match the inputted name;
retrieving contact information associated with the inputted name; and
sending a second notification to the retrieved contact information.

8. The method of claim 7, wherein the first notification comprises:
the inputted name;
the captured image;
the name associated with the at least one online image; and
the online image.

9. The method of claim 7, further comprising:
determining the retrieved name does not match the inputted name; and
disconnecting the individual from the online event.

10. The method of claim 7, wherein the second notification comprises:
the inputted name;
the captured image;
the name associated with the at least one online image; and
the online image.

11. The method of claim 7, further comprising:
sending a third notification to the individual that their identity has been verified.

12. The method of claim 7, wherein the online event is an examination for an online class.

13. A system for validating an identity of an individual within an online event, the system comprising:
a camera operable to capture an image of the individual from a video stream of the online event;
a processor operable to:
compare the captured image to a plurality of stored images;
determine that the captured image matches at least one stored image from the plurality of stored images;
retrieve a name associated with the at least one stored image; and
determine if the retrieved name matches an inputted name provided by the individual;
retrieve contact information associated with the inputted name if the retrieved name and the inputted name do not match; and
communications circuitry operable to send a first notification to a host of the online event and send a second notification to the retrieved contact information if the retrieved name and the inputted name do not match.

14. The system of claim 13, wherein the first notification comprises:
the inputted name;
the captured image;
the name associated with the at least one stored image; and
the stored image.

15. The system of claim 13, wherein the processor is further operable to:
determine the retrieved name does not match the inputted name; and
disconnect the individual from the online event.

16. The system of claim 13, wherein the second notification comprises:
the inputted name;
the captured image;
the name associated with the at least one stored image; and
the stored image.

17. The system of claim 13, wherein the communications circuitry is further operable to:
send a third notification to the individual that their identity has been verified.

* * * * *